United States Patent
Ueda et al.

(10) Patent No.: US 10,763,095 B2
(45) Date of Patent: Sep. 1, 2020

(54) IONIZER AND MASS SPECTROMETER SYSTEM

(71) Applicant: SHIMADZU CORPORATION, Kyoto-shi, Kyoto (JP)

(72) Inventors: Manabu Ueda, Kyoto (JP); Wataru Fukui, Kyoto (JP)

(73) Assignee: SHIMADZU CORPORATION, Kyoto-shi, Kyoto (JP)

(*) Notice: Subject to any disclaimer, the term of this patent is extended or adjusted under 35 U.S.C. 154(b) by 0 days.

(21) Appl. No.: 16/090,932

(22) PCT Filed: Jun. 2, 2016

(86) PCT No.: PCT/JP2016/066369
§ 371 (c)(1),
(2) Date: Oct. 3, 2018

(87) PCT Pub. No.: WO2017/208417
PCT Pub. Date: Dec. 7, 2017

(65) Prior Publication Data
US 2019/0108991 A1  Apr. 11, 2019

(51) Int. Cl.
*H01J 49/04* (2006.01)
*G01N 30/72* (2006.01)
(Continued)

(52) U.S. Cl.
CPC ...... *H01J 49/0404* (2013.01); *G01N 30/7266* (2013.01); *H01J 49/0445* (2013.01);
(Continued)

(58) Field of Classification Search
CPC .. H01J 49/0404; H01J 49/0445; H01J 49/167; H01J 49/4215; G01N 30/7266; G01N 30/72; G01N 2030/027
See application file for complete search history.

(56) References Cited

U.S. PATENT DOCUMENTS 4,891,515 A * 1/1990 Jones ............... G01N 30/28
250/288
5,115,131 A * 5/1992 Jorgenson ......... H01J 49/165
250/282
(Continued)

FOREIGN PATENT DOCUMENTS

JP     3-276550 A    12/1991
JP     06-039994 A    2/1994
(Continued)

OTHER PUBLICATIONS

Sun et al, "Surface Free Energy of Alloy Nitride Coatings Deposited Using Closed Field Unbalanced Magnetron Sputter Ion Plating", Materials Transactions Vo. 47 No. 10 (2006) Japan Institute of Metals (Year: 2006).*
(Continued)

*Primary Examiner* — David E Smith
(74) *Attorney, Agent, or Firm* — Sughrue Mion, PLLC

(57) ABSTRACT

In the mass spectrometer system, a tip portion of a cylindrical portion (891) of a capillary (89) is coated with a coating material (892), the tip portion being an injection part for injecting a sample solution to an ionization section. Therefore, it is possible to suppress, by the coating material (892), the deformation of the capillary (89) when the sample solution is injected. In addition, it is possible to suppress the corrosion and the deformation of the capillary (89) by the coating material (892). As a result, the stability of the analysis operation in mass spectrometer system (1) can be improved.

15 Claims, 10 Drawing Sheets

(51) Int. Cl.
   *H01J 49/16*     (2006.01)
   *G01N 30/02*     (2006.01)
   *H01J 49/42*     (2006.01)

(52) U.S. Cl.
   CPC ............ *H01J 49/167* (2013.01); *G01N 30/72* (2013.01); *G01N 2030/027* (2013.01); *H01J 49/4215* (2013.01)

(56) References Cited

U.S. PATENT DOCUMENTS

| | | | | |
|---|---|---|---|---|
| 5,441,613 | A * | 8/1995 | McCormick | G01N 27/44752 204/452 |
| 2001/0036424 | A1 * | 11/2001 | Takahashi | B01J 19/0046 422/504 |
| 2004/0124173 | A1 * | 7/2004 | Hess | A61M 11/005 216/27 |
| 2004/0124805 | A1 * | 7/2004 | Edwards | H02M 7/487 318/700 |
| 2006/0022131 | A1 * | 2/2006 | Tojo | G01N 30/7266 250/288 |
| 2006/0097153 | A1 | 5/2006 | Seaward et al. | |
| 2009/0236518 | A1 | 9/2009 | Kobayashi | |
| 2012/0104248 | A1 * | 5/2012 | Hardman | H01J 49/165 250/288 |
| 2014/0144782 | A1 * | 5/2014 | Nagoshi | C23C 26/00 205/111 |
| 2014/0291507 | A1 | 10/2014 | Brown et al. | |
| 2015/0144782 | A1 * | 5/2015 | Fogwill | H01J 49/10 250/282 |

FOREIGN PATENT DOCUMENTS

| | | |
|---|---|---|
| JP | 11-010426 A | 1/1999 |
| JP | 2004-186113 A | 7/2004 |
| JP | 2006-134877 A | 5/2006 |
| JP | 2014-532966 A | 12/2014 |
| JP | 2015-194363 A | 11/2015 |
| WO | 2007/032088 A1 | 3/2007 |

OTHER PUBLICATIONS

Sun et al, "Surface Free Energy of Alloy Nitride Coatings Deposited Using Closed Field Unbalanced Magnetron Sputter Ion Plating", Materials Transactions vol. 47 No. 10 (2006) Japan Institute of Metals (Year: 2006).*
International Search Report of PCT/JP2016/066369 dated Aug. 9, 2016 [PCT/ISA/210].
Written Opinion of PCT/JP2016/066369 dated Aug. 9, 2016 [PCT/ISA/237].
Communication dated Jul. 9, 2019, from the Japanese Patent Office in counterpart Application No. 2018-520298.

* cited by examiner

IONIZER AND MASS SPECTROMETER SYSTEM

CROSS REFERENCE TO RELATED APPLICATIONS

This application is a National Stage of International Application No. PCT/JP2016/066369, filed Jun. 2, 2016.

TECHNICAL FIELD

The present invention relates to an ionizer for injecting a sample solution to an ionization section of a mass spectrometer to ionize the sample solution, and a mass spectrometer system including the same.

BACKGROUND ART

Conventionally, a mass spectrometer has been used which includes an ionization section for ionizing a sample, injects a sample solution in the ionization section at the time of analysis and separates the generated ions according to the mass-to-charge ratio (m/z). In addition, a device using chromatograph is also used in the front stage of the mass spectrometer.

For example, in a device using liquid chromatograph in the front stage of the mass spectrometer, a sample is injected into a mobile phase sent at a constant flow rate, and sample components contained in the mobile phase are separated in time in a separation column. Then, the separated sample components (sample solution) are injected into the ionization section of the mass spectrometer (see, for example, Patent Document 1 below). As the mobile phase, for example, a liquid such as water or methanol is used.

Also, a supercritical fluid chromatograph using, for example, a fluid in a supercritical state such as carbon dioxide as the mobile phase is also known (for example, see Patent Document 2 below).

PRIOR ART DOCUMENTS

Patent Documents

Patent Document 1: WO 2007/032088 A
Patent Document 2: JP 2015-194363 A

SUMMARY OF THE INVENTION

Problems to be Solved by the Invention

In the conventional device as described above, a capillary (tubule) is arranged in the ionization section, and a sample solution is injected from the capillary. Simultaneously, at this time, a high voltage is applied to the capillary during ionization, or the capillary is exposed to a high-temperature gas or an organic solvent, so that a load is applied particularly to the tip portion of the capillary, and the capillary is sometimes deformed (damaged). In this case, the spray state of the sample solution changes and the ionization is not stabilized, so that there is a possibility that a stable analysis operation is hindered. Furthermore, there is a necessity to frequently exchange the capillary, which requires labor and cost for maintenance. Particularly, when a supercritical fluid is used as the mobile phase, adiabatic expansion occurs at the time of spraying, a larger load is applied to the capillary, and the capillary is likely to be deformed. Since carbon dioxide has an action for corroding metals, when carbon dioxide is used as a supercritical fluid, metal capillary sometimes corrodes. In addition, the material component itself may dissolve into the sample solution, and in this case, the reliability of analysis decreases.

The present invention has been made in view of the above circumstances, and an object thereof is to provide an ionizer and a mass spectrometer system capable of improving the stability of an analysis operation.

Means for Solving the Problems (1) An ionizer according to the present invention is an ionizer for injecting a sample solution to an ionization section of a mass spectrometer to ionize the sample solution. The ionizer includes a capillary. The capillary has a tubular shape in which a sample solution passing through the inside is injected from a tip portion. At least a part of the tip portion of the capillary is coated with a coating material. As the material of the capillary, SUS or fused silica is preferable. As the coating material, another material different from the material of the capillary, that is a material having higher strength or a material having higher corrosivity than the material of the capillary, is preferable.

According to such a configuration, in the mass spectrometer, the injection part for injecting a sample solution from the capillary of the ionizer is coated with the coating material. The region to be coated preferably includes at least the side surface and the end surface of the entire capillary. Also, when the cost of coating is reduced or coating is difficult, the coating may be performed only on the tip surface or only on the side surface of the capillary.

With such a configuration, by the coating material, it is possible to suppress the deformation (damage) of the capillary when the sample solution is injected.

As a result, the stability of the analysis operation in the mass spectrometer can be improved.

(2) In addition, the coating material may be chromium nitride.

According to such a configuration, it is possible to coat the capillary of the ionizer with an inexpensive material.

(3) In addition, the coating material may be platinum.

According to such a configuration, it is possible to coat the capillary of the ionizer with a material having high corrosion resistance. Therefore, deformation of the capillary of the ionizer due to corrosion can be suppressed.

(4) In addition, the coating material may be titanium.

According to such a configuration, it is possible to coat the capillary of the ionizer with a material having high corrosion resistance. Therefore, deformation of the capillary of the ionizer due to corrosion can be suppressed.

(5) Also, the coating material may be diamond-like carbon.

According to such a configuration, abrasion resistance and gas barrier properties of the capillary of the ionizer can be improved by the coating material of diamond-like carbon.

(6) Further, the coating material may be a fluororesin.

According to such a configuration, the strength and durability of the capillary of the ionizer can be improved by the coating material of fluororesin.

(7) In addition, a supercritical fluid containing sample components may be injected from the capillary as a sample solution.

According to such a configuration, it is possible to suppress, by the coating material, the deformation (damage) of the capillary due to the adiabatic expansion when the supercritical fluid is injected and the action of corrosion when using carbon dioxide as the supercritical fluid.

That is, even when the supercritical fluid is injected from the capillary, deformation (damage) of the capillary can be suppressed, and the stability of the analysis operation in the mass spectrometer can be improved.

(8) In addition, the sample solution injected from the capillary may be ionized by an electrospray method.

(9) Further, the sample solution injected from the capillary may be ionized by an atmospheric pressure chemical ionization method.

(10) A mass spectrometer system according to the present invention includes the ionizer.

Effects of the Invention

According to the present invention, by the action of the coating material, it is possible to suppress the deformation (damage) of the capillary of the ionizer due to the physical and chemical loads on the capillary when the sample solution is injected. Therefore, the stability of the analysis operation in the mass spectrometer system can be improved.

MODE FOR CARRYING OUT THE INVENTION

1. Overall Configuration of Mass Spectrometer System

Figure 1:
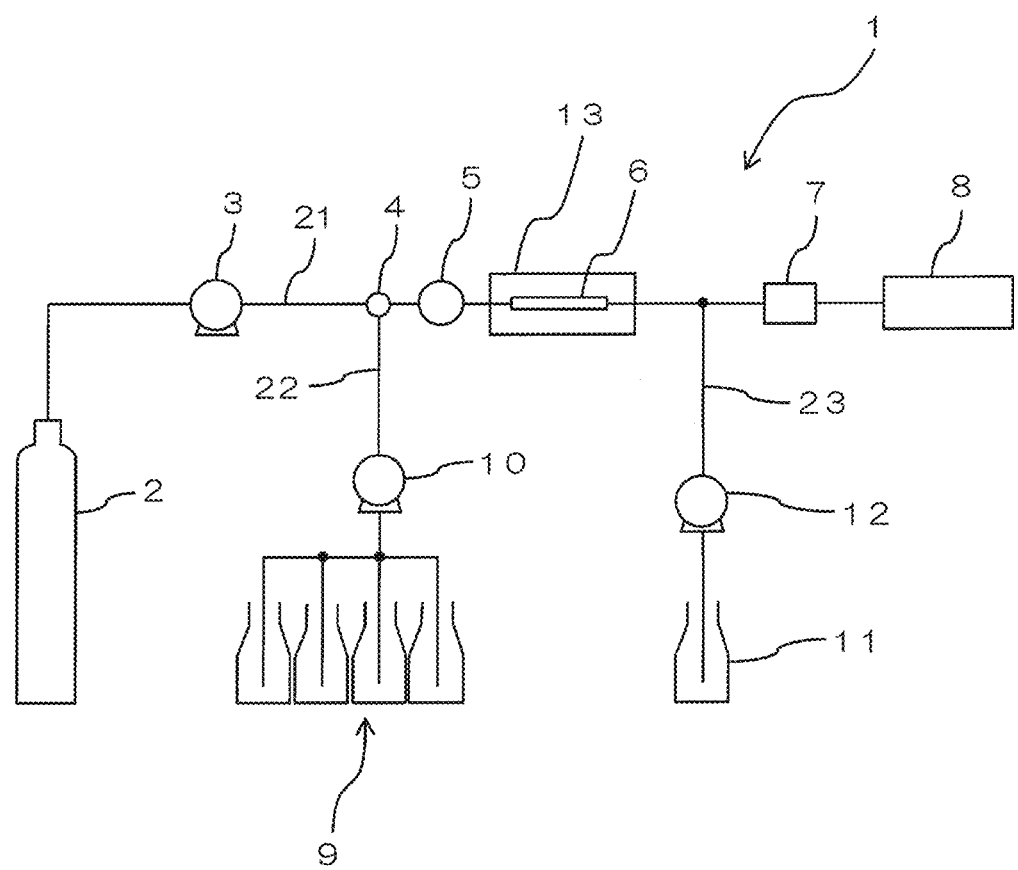
FIG. 1 is a schematic diagram showing a configuration of a mass spectrometer system according to a first embodiment of the present invention.

FIG. 1 is a schematic diagram showing a mass spectrometer system 1 according to a first embodiment of the present invention.

The mass spectrometer system 1 includes, as flow paths, a mobile phase flow path 21, a modifier flow path 22 connected to a midway part of the mobile phase flow path 21 via a mixer 4, and a makeup flow path 23 at the midway part of the mobile phase flow path 21 and connected to the midway part on the downstream side of the mixer 4 in the inflow direction.

In the mobile phase flow path 21, a first reservoir 2, a first pump 3, a mixer 4, a sample introduction part 5, a separation column 6, a back pressure valve 7, and a mass spectrometer 8 are arranged in this order in the inflow direction.

In the first reservoir 2, carbon dioxide as a liquid to be a mobile phase is stored.

The sample introduction part 5 is, for example, an autosampler.

The separation column 6 is accommodated in a column oven 13 and heated.

The back pressure valve 7 is configured to keep a constant pressure in the mobile phase flow path 21, in order to maintain the mobile phase in the mobile phase flow path 21 in a supercritical fluid state.

In the modifier flow path 22, a second reservoir 9 and a second pump 10 are arranged in this order in the inflow direction. A plurality of modifier solutions is stored in the second reservoir 9. The modifier solution is, for example, a polar solvent such as ethanol or methanol.

In the makeup flow path 23, a third reservoir 11 and a third pump 12 are arranged in this order in the inflow direction. In the third reservoir 11, a makeup solution is stored. The makeup solution is, for example, a solution containing an ionization accelerator such as formic acid or ammonia in an organic solvent such as methanol or water.

In the mass spectrometer system 1, carbon dioxide is sent from the first reservoir 2 to the mobile phase flow path 21 by the operation of the first pump 3. In addition, the modifier solution is sent from the second reservoir 9 to the modifier flow path 22 by the operation of the second pump 10. Then, these are mixed in the mixer 4, and the sample is injected into the mobile phase flow path 21 from the sample introduction part 5 in a state where the mobile phase is maintained in the supercritical state. The sample is transported to the separation column 6 by the mobile phase in the supercritical state, separated for each component, and introduced from the separation column 6 into the mass spectrometer 8 via the back pressure valve 7. Then, in the mass spectrometer 8, the sample components are analyzed. At this time, in order to promote the ionization of the sample components in the mass spectrometer 8, by the operation of the third pump 12, the makeup solution is supplied from the third reservoir 11 to the mass spectrometer 8 via the makeup flow path 23 and the mobile phase flow path 21.

2. Detailed Configuration of Mass Spectrometer

Figure 2:
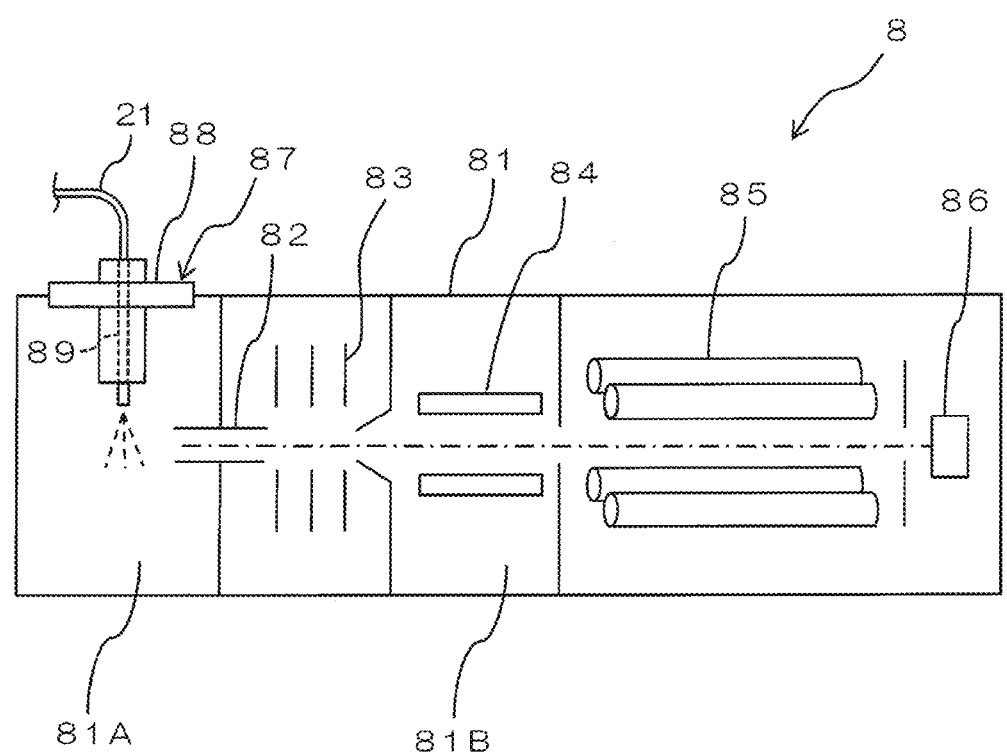
FIG. 2 is an enlarged diagram schematically showing a mass spectrometer.

FIG. 2 is an enlarged diagram schematically showing the mass spectrometer 8.

The mass spectrometer 8 includes a housing 81, an ion introduction tube 82, ion guides 83 and 84, a quadrupole mass filter 85, a detector 86, and an ionizer 87.

The housing 81 is formed in an elongated hollow shape. In the housing 81, an ionization section 81A and a vacuum section 81B are partitioned. The ionization section 81A is disposed at the most upstream portion in the ion movement direction. The vacuum section 81B is disposed on the downstream side of the ionization section 81A in the ion movement direction. In the vacuum section 81B, the degree of vacuum increases toward the downstream side in the ion movement direction.

The ion introduction tube 82 is arranged so as to extend over the ionization section 81A and the vacuum section 81B in the housing 81. The ion introduction tube 82 guides the ions derived from the compound in the sample generated in the ionization section 81A into the vacuum section 81B.

The ion guides 83 and 84 are arranged in the vacuum section 81B in the housing 81. The ion guides 83 and 84 are configured to transport ions while converging ions.

The quadrupole mass filter 85 is arranged downstream of the ion guide 84 in the ion movement direction in the housing 81 (the vacuum section 81B). The quadrupole mass filter 85 is configured to pass only ions having a specific mass-to-charge ratio.

The detector 86 is arranged at the most downstream in the ion movement direction in the housing 81 (the vacuum section 81B).

The ionizer 87 is attached to the housing 81 so that a part thereof is arranged in the ionization section 81A. The ionizer 87 includes a main body part 88 and a capillary 89.

The main body part 88 is formed in a columnar shape having different diameters according to the vertical position. The upper portion of the main body part 88 protrudes to the outside (upward) of the housing 81, the central portion thereof is attached to the housing 81, and the lower portion thereof is arranged in the housing 81 (ionization section 81A).

The capillary 89 is formed in a tubular shape, and a part of the outer peripheral surface thereof is covered with the main body part 88. An upper end portion (one end portion) of the capillary 89 is connected to the mobile phase flow path 21, and a lower end portion (other end portion) thereof protrudes from the lower end of the main body part 88 into the ionization section 81A.

3. Detailed Configuration of Capillary

Figure 3:
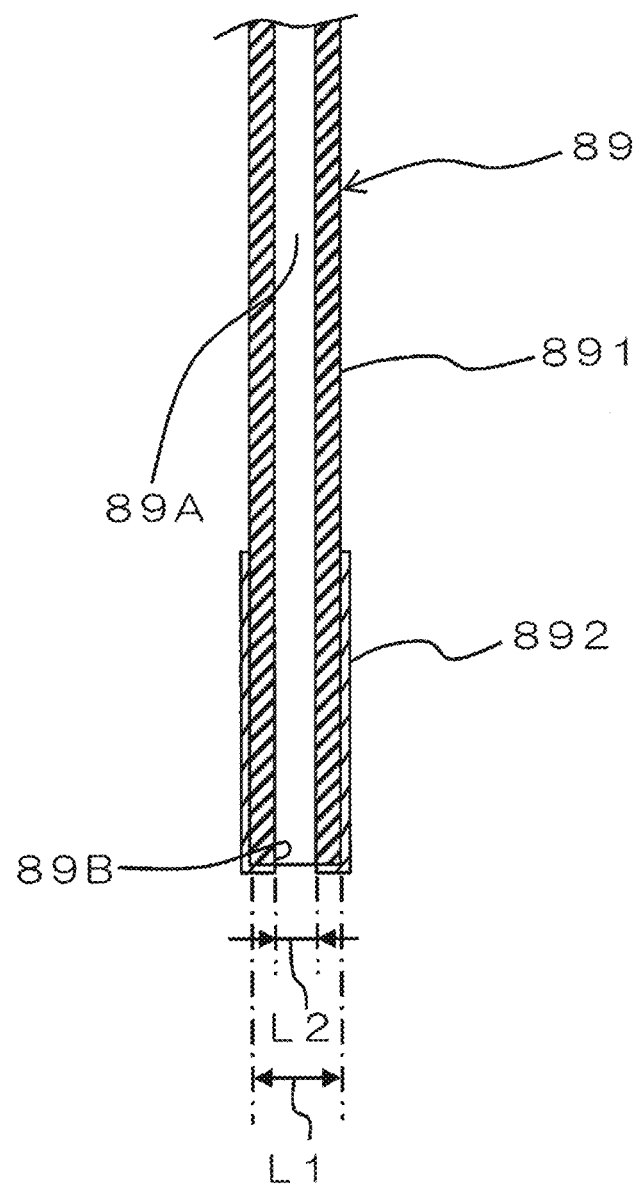
FIG. 3 is a cross-sectional view showing a capillary of an ionizer.

FIG. 3 is a cross-sectional view showing the capillary 89 of the ionizer 87.

The capillary 89 includes a tubular (cylindrical) cylindrical portion 891 made of SUS, fused silica or the like. The outer diameter L1 of the cylindrical portion 891 is about 0.2 mm, and the inner diameter L2 is about 0.1 mm. The internal space (the internal space excluding the tip edge) of the cylindrical portion 891 is formed as a passage port 89A. The internal space of the tip edge of the cylindrical portion 891 is formed as an outflow port 89B. The tip portion of the cylindrical portion 891 is coated with a coating material 892.

The coating material 892 is made of another material different from the material of the capillary 89, that is a material having higher strength or a material having higher corrosivity than the material of the capillary 89. Specifically, the coating material 892 is made of, for example, chromium nitride. The coating material 892 covers the outer peripheral surface and the tip surface (other than the outflow port 89B) of the tip portion of the cylindrical portion 891. The thickness of the coating material 892 is about 10 µm. The coating material 892 is formed with a constant thickness by placing the capillary 89 in a furnace and applying heat and electricity while coating chromium nitride in the furnace.

4. Ionization of Sample Solution

In the mass spectrometer 8 of the present embodiment, the sample solution is ionized by an electrospray method (ESI). Specifically, as shown in FIG. 1, in the mobile phase flow path 21, the mobile phase (carbon dioxide of a supercritical fluid) is released to atmospheric pressure, on the downstream side of the back pressure valve 22. Therefore, the sample components separated by the separation column 6 and eluted are discharged together with the supercritical fluid as a mist on the downstream side of the back pressure valve 22. In addition, a high voltage is applied to the capillary 89. As shown in FIG. 2, the mixed solution (sample solution) of the separated sample components and the supercritical fluid moves from the mobile phase flow path 21 to the capillary 89, and is sprayed from the tip of the capillary 89 to the ionization section 81A to be ionized. At this time, specifically, as shown in FIG. 3, the sample solution moved from the mobile phase flow path 21 to the capillary 89 passes through the passage port 89A and then is injected from the outflow port 89B into the outside (ionization section 81A). In this way, a supercritical fluid (carbon dioxide of a supercritical fluid) containing sample components is injected from the capillary 89 as the sample solution.

As shown in FIG. 2, the ions are introduced into the quadrupole mass filter 85 through the ion introduction tube 82 and the ion guides 83 and 84. The quadrupole mass filter 85 selectively passes only ions having a specific mass-to-charge ratio, and the passed ions reach a detector 26 to be detected. Then, in the mass spectrometer 8, a mass spectrum and a mass chromatogram are created from data based on the detection signal obtained from the detector 26.

5. Shape of Capillary after Use

Figure 4A:
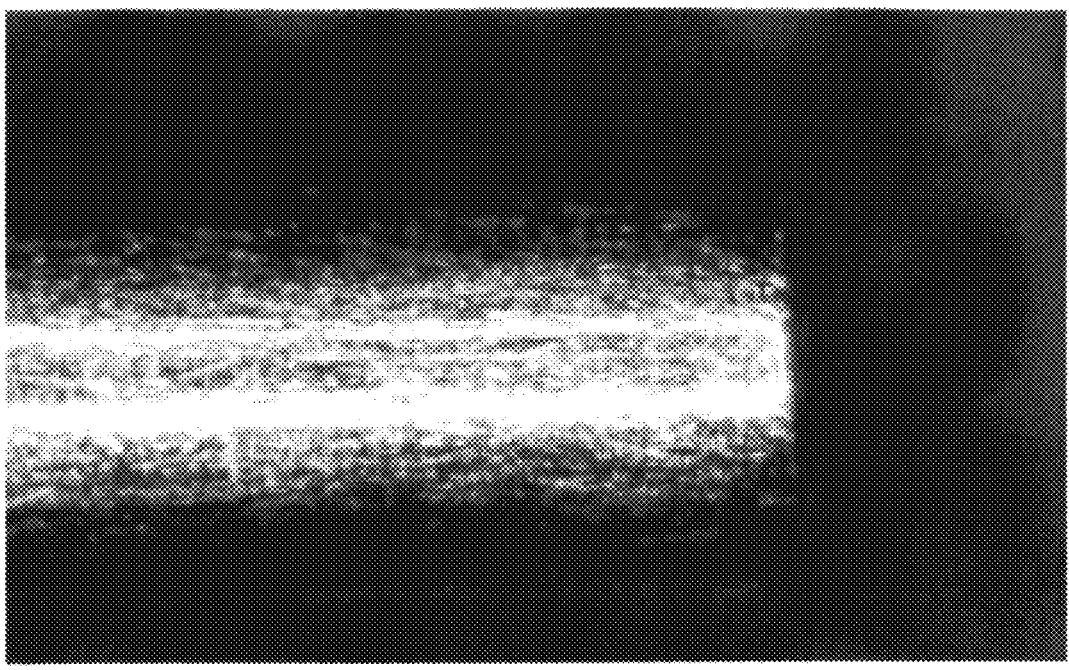
FIG. 4A is a view showing a circumferential surface of a used capillary in a case where a standard capillary is used in a chromatograph mass spectrometer using a liquid as a mobile phase.
Figure 4B:
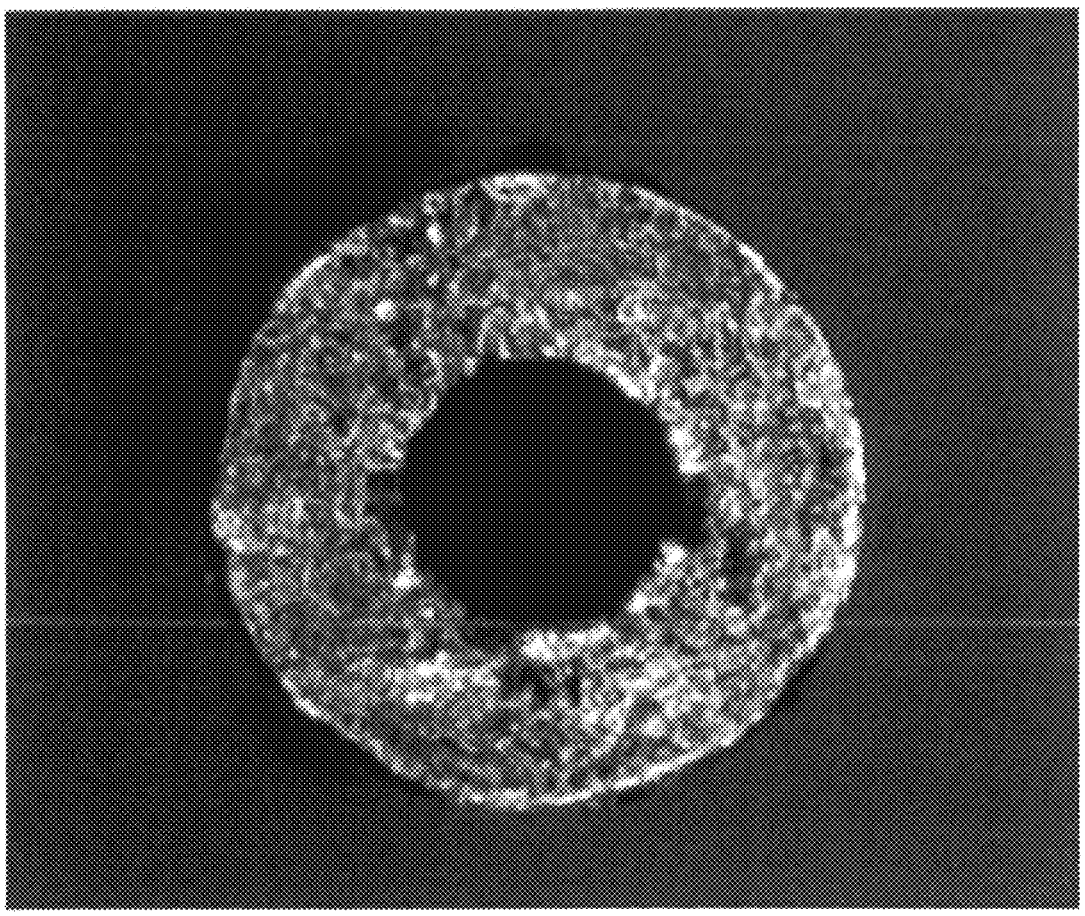
FIG. 4B is a view showing the tip of the capillary in FIG. 4A.

FIG. 4A is a view showing a circumferential surface of a used capillary in a case where a standard capillary is used in a chromatograph mass spectrometer using a liquid as the mobile phase. FIG. 4B is a view showing the tip of the capillary shown in FIG. 4A.

It can be confirmed from FIGS. 4A and 4B that, as a result of performing analysis using a capillary (standard capillary) not forming a coating material in the liquid chromatograph mass spectrometer, the circumferential surface and tip of the used capillary is deteriorated.

Figure 5A:
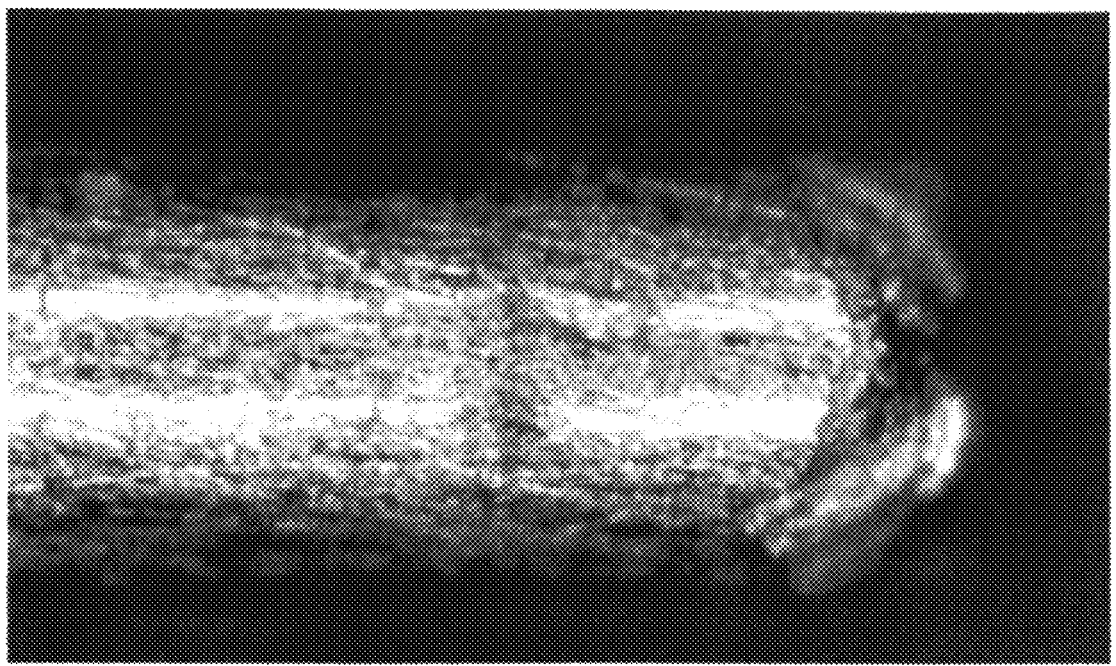
FIG. 5A is a view showing a circumferential surface of a used capillary in a case where a supercritical fluid is used as a mobile phase and a standard capillary is used, in a mass spectrometer system.
Figure 5B:
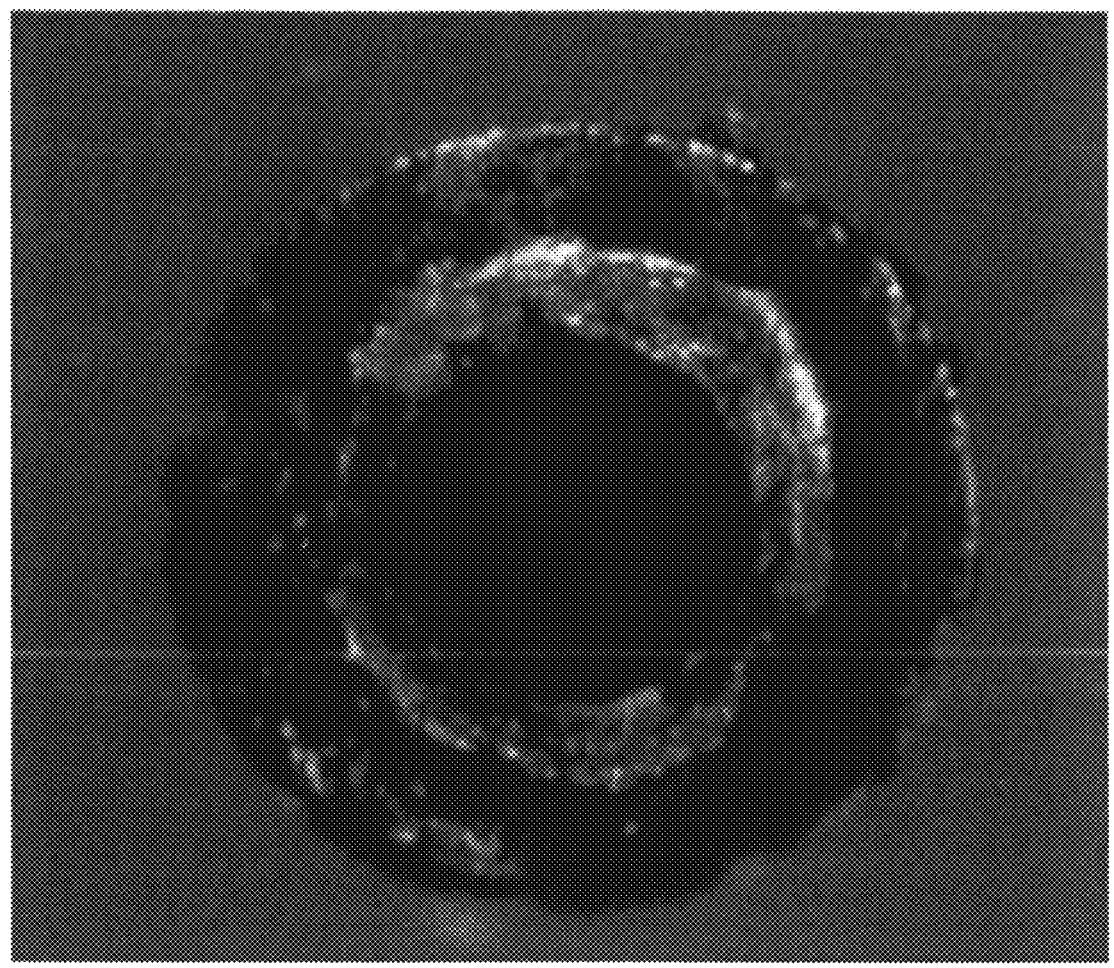
FIG. 5B is a view showing the tip of the capillary in FIG. 5A.

FIG. 5A is a view showing a circumferential surface of a used capillary in a case where a supercritical fluid is used as the mobile phase and a standard capillary is used, in the mass spectrometer system 1. FIG. 5B is a view showing the tip of the capillary shown in FIG. 5A.

It can be confirmed from FIGS. 5A and 5B that, as a result of performing analysis using a supercritical fluid as the mobile phase and using a capillary (standard capillary) not forming a coating material, in place of the capillary 89, the circumferential surface is greatly deteriorated, and the tip is scraped in the used capillary. Moreover, it can be also confirmed that the inner circumferential surface near the tip is greatly deteriorated in the used capillary.

From the comparison between FIGS. 4A and 4B and FIGS. 5A and 5B, it can be seen that, in the case of spraying a supercritical fluid, the periphery of the capillary is in a particularly severe state. Deterioration of the capillary in the mass spectrometer system may be not only physical deterioration but also possibility of corrosion due to carbon dioxide.

Figure 6A:
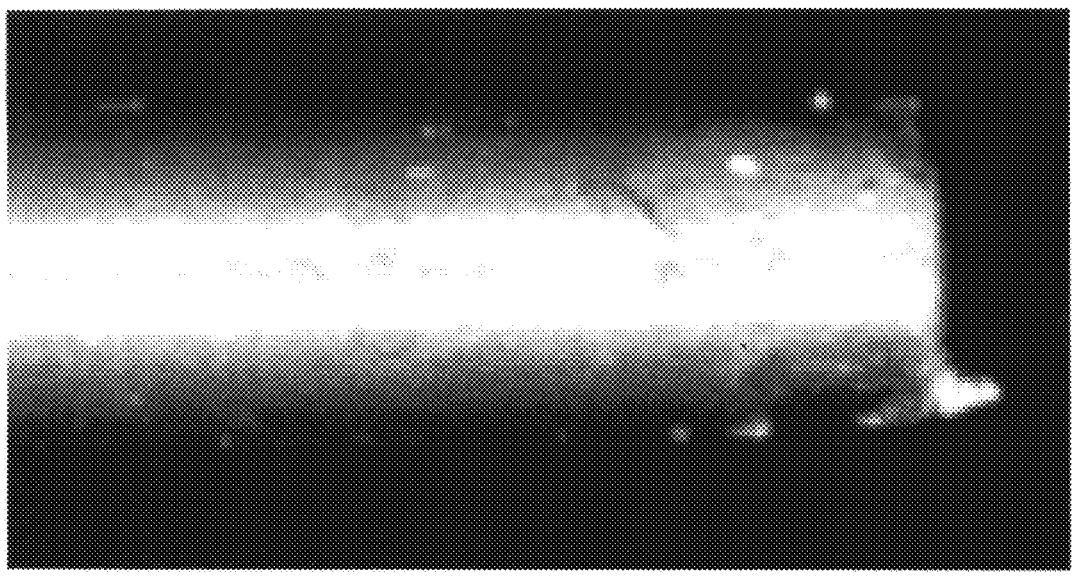
FIG. 6A is a view showing a circumferential surface of a used capillary in a case where a supercritical fluid is used as a mobile phase and a capillary on which a coating material is formed is used, in the mass spectrometer system.
Figure 6B:
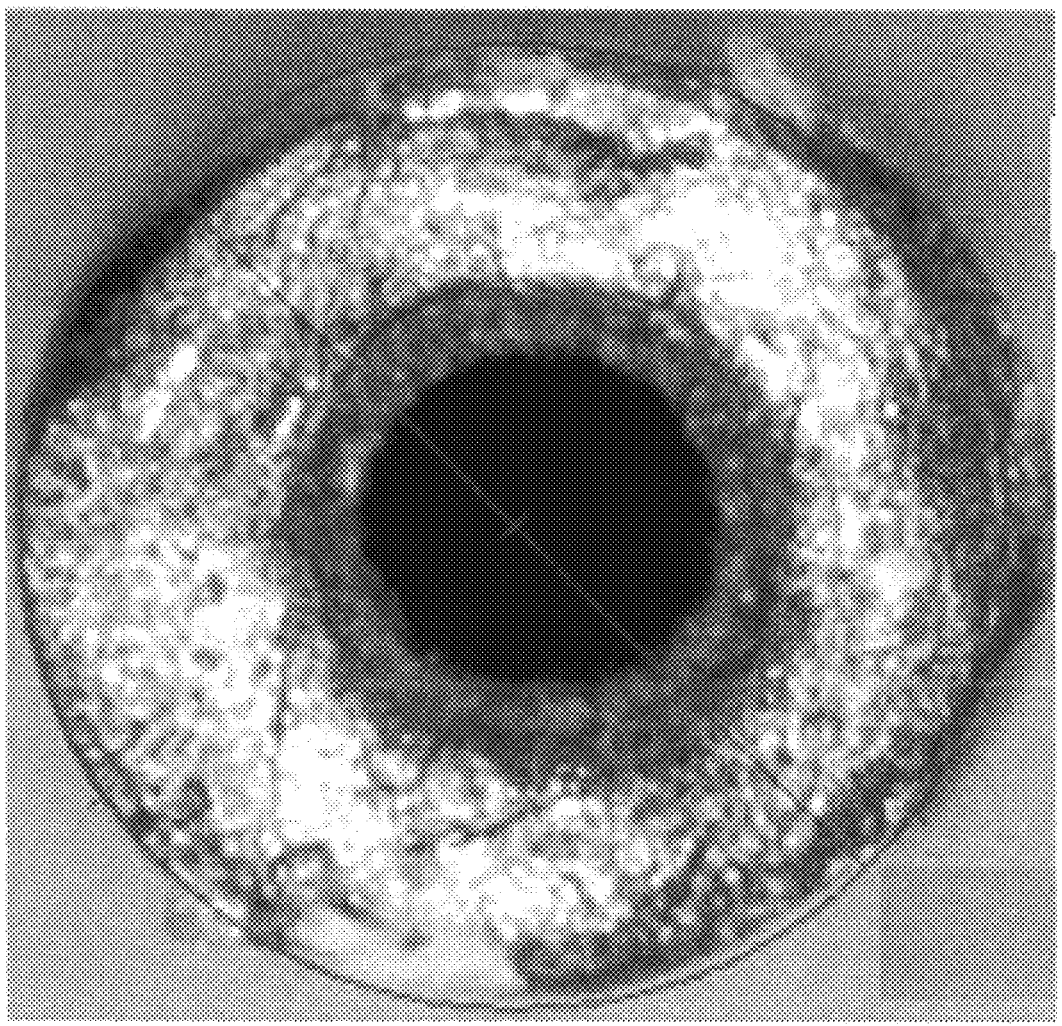
FIG. 6B is a view showing the tip of the capillary in FIG. 6A.

FIG. 6A is a view showing a circumferential surface after use in a case where a supercritical fluid is used as the mobile phase and the capillary 89 of the present invention described above is used, in the mass spectrometer system 1. FIG. 6B is a view showing the tip of the capillary 89 shown in FIG. 6A.

It can be confirmed from FIGS. 6A and 6B that, as a result of spraying the supercritical fluid and performing analysis, as compared with the cases of FIGS. 5A and 5B, the deterioration of the shape of the capillary 89 coated with the coating material 892 is extremely small. From this result, it can be seen that the coating material 892 can prevent physical deterioration and corrosion due to carbon dioxide of the capillary 89.

6. Acquired Data in Mass Spectrometer System

Figure 7:
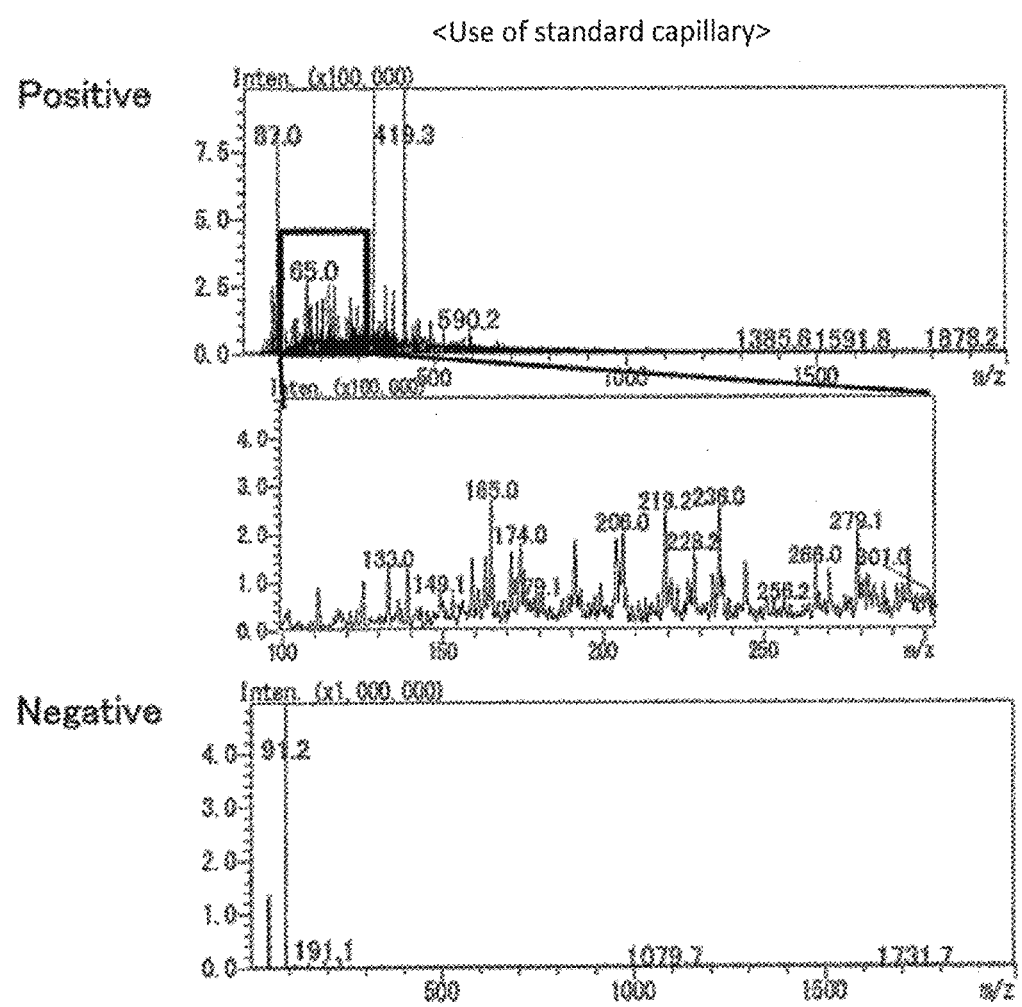
FIG. 7 is a diagram showing a mass spectrum obtained when a supercritical fluid is used as a mobile phase and a standard capillary is used, in the mass spectrometer system.

FIG. 7 is a diagram showing a mass spectrum obtained when a supercritical fluid is used as the mobile phase and a standard capillary is used, in the mass spectrometer system 1. Also, FIG. 8 is a diagram showing a mass spectrum obtained when a supercritical fluid is used as the mobile phase and the capillary 89 of the present invention is used, in the mass spectrometer system 1.

Figure 8:
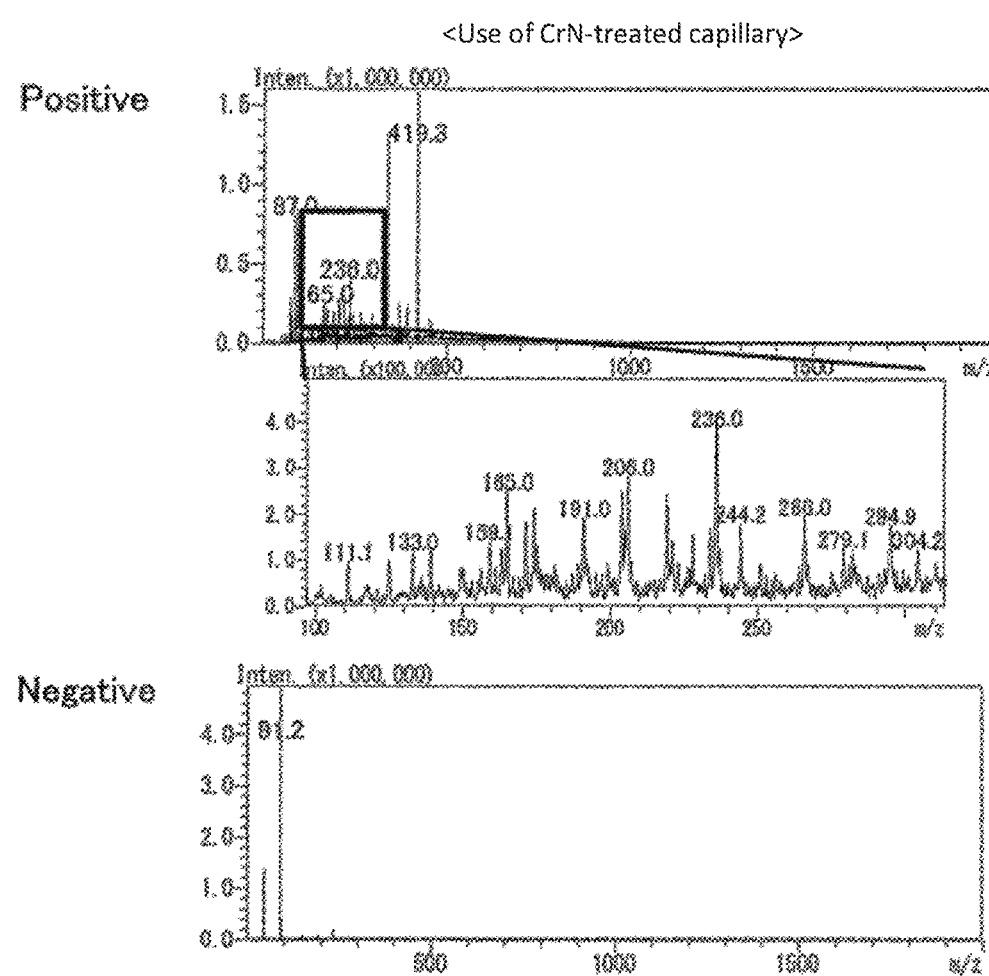
FIG. 8 is a diagram showing a mass spectrum obtained when a supercritical fluid is used as a mobile phase and a capillary on which a coating material is formed is used, in the mass spectrometer system.

It can be confirmed from FIGS. 7 and 8 that the same peak appears at the same mass-to-charge ratio in each mass spectrum.

Figure 9:
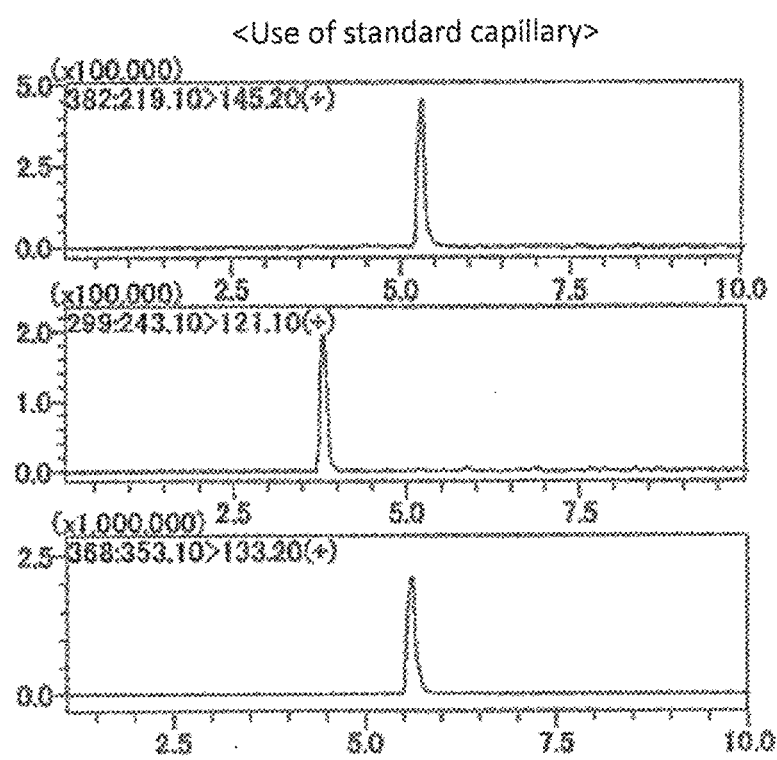
FIG. 9 is a diagram showing a mass chromatogram obtained when a supercritical fluid is used as a mobile phase and a standard capillary is used, in the mass spectrometer system.

FIG. 9 is a diagram showing a mass chromatogram obtained when a supercritical fluid is used as the mobile phase and a standard capillary is used, in the mass spectrometer system 1. Also, FIG. 10 is a diagram showing a mass chromatogram obtained when a supercritical fluid is used as the mobile phase and the capillary 89 of the present invention is used, in the mass spectrometer system 1.

Figure 10:
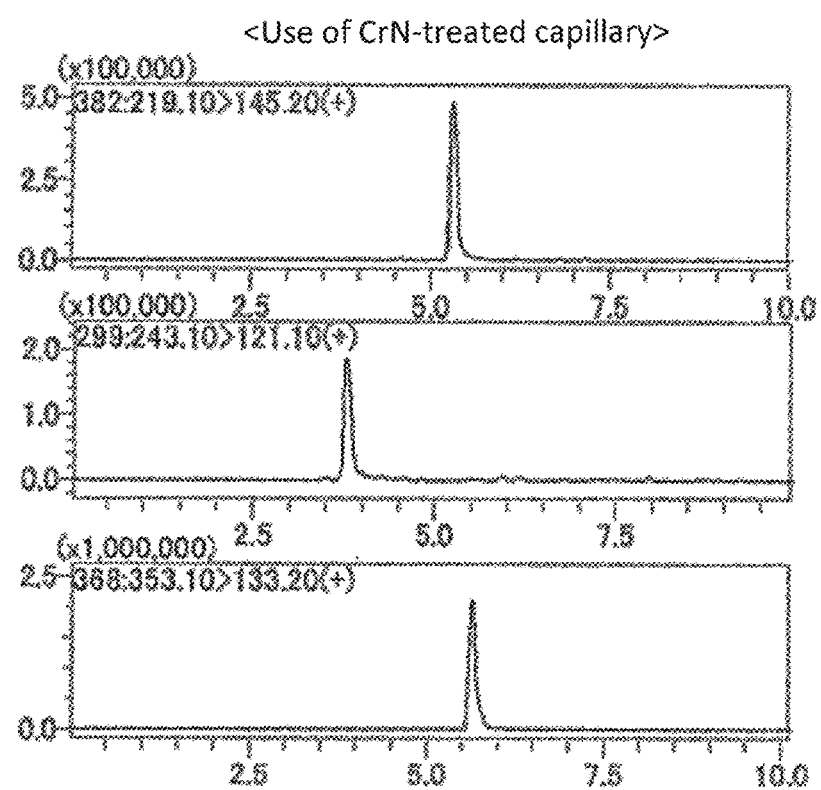
FIG. 10 is a diagram showing a mass chromatogram obtained when a supercritical fluid is used as a mobile phase and a capillary on which a coating material is formed is used, in the mass spectrometer system.

It can be confirmed from FIG. 9 and FIG. 10 that there is no change in signal intensity appearing in each mass chromatogram.

From these facts, it can be confirmed that impurities are not eluted from the coating material 892 when performing analysis using the capillary 89, in the mass spectrometer system 1.

7. Action Effect (1) In the present embodiment, in the mass spectrometer system 1, the tip portion of the cylindrical portion 891 of the capillary 89, which is the injection part for injecting the sample solution to the ionization section 81A, is coated with the coating material 892.

Therefore, it is possible to suppress, by the coating material 892, the deformation (damage) of the capillary 89 when the sample solution is injected.

As a result, the stability of analysis operation in the mass spectrometer system 1 (mass spectrometer 8) can be improved.

(2) Also, the coating material 892 of the capillary 89 is made of chromium nitride.

Therefore, it is possible to coat the capillary 89 with an inexpensive material.

(3) In addition, carbon dioxide of a supercritical fluid containing sample components is injected from the capillary 89, as the sample solution.

Therefore, it is possible to suppress, by the coating material 892, the deformation (damage) of the capillary 89 due to the adiabatic expansion when the supercritical fluid is injected and the action of corrosion of carbon dioxide of a supercritical fluid.

That is, even when carbon dioxide of a supercritical fluid is injected from the capillary 89, deformation (damage) of the capillary 89 can be suppressed, and the stability of the analysis operation in the mass spectrometer system 1 (mass spectrometer 8) can be improved.

8. Other Embodiments (1) In the first embodiment, the coating material 892 of the capillary 89 is made of chromium nitride. On the other hand, the coating material 892 of the capillary 89 can also be configured by platinum.

According to such a configuration, it is possible to coat the capillary 89 of the ionizer 87 with a material having high corrosion resistance. Therefore, deformation of the capillary 89 of the ionizer 87 due to corrosion can be suppressed.

(2) In addition, the coating material 892 of the capillary 89 can also be configured by titanium.

According to such a configuration, it is possible to coat the capillary 89 of the ionizer 87 with a material having high corrosion resistance. Therefore, deformation of the capillary 89 of the ionizer 87 due to corrosion can be suppressed.

(3) Further, the coating material 892 of the capillary 89 can also be configured by diamond-like carbon (DLC).

According to such a configuration, abrasion resistance and gas barrier properties of the capillary 89 of the ionizer 87 can be improved. Coating with diamond-like carbon can be performed by introducing $C_6H_6$ gas into a vacuum and forming a film in arc discharge plasma.

(4) Further, the coating material 892 of the capillary 89 can also be configured by a fluororesin.

According to such a configuration, the strength and durability of the capillary 89 of the ionizer 87 can be improved by a fluororesin, which is an example of a resin, not limited to metal.

(5) Moreover, in the first embodiment, in the mass spectrometer 8, the sample solution injected into the ionization section 81A is ionized by the electrospray method. On the other hand, in the mass spectrometer 8, it is also possible to ionize the sample solution injected into the ionization section 81A by an atmospheric pressure chemical ionization method (APCI).

9. Modified Examples

In the description of the above embodiment, the capillary 89 of the present invention is provided in the mass spectrometer 8 connected to the supercritical fluid chromatograph. However, the capillary 89 may be provided in a mass spectrometer used with other chromatographs such as liquid chromatographs.

Further, the coating material 892 can be formed on the cylindrical portion 891 of the capillary 89 by any method such as sputtering process.

Also, the coating material 892 may be formed on the entire outer surface of the cylindrical portion 891 of the capillary 89, may be formed only on the outer peripheral surface of the cylindrical portion 891 of the capillary 89, or may be formed only on the tip surface of the cylindrical portion 891 of the capillary 89.

DESCRIPTION OF REFERENCE SIGNS 1 mass spectrometer system
81A ionization section
87 ionizer
89 capillary

The invention claimed is:

1. An ionizer for injecting a sample solution to an ionization section of a mass spectrometer to ionize the sample solution, the ionizer comprising
a capillary having a tubular shape and a tip portion from which the sample solution passing through an inside of the capillary is injected,
wherein
at least a part of the tip portion of the capillary is coated with a coating material,
a supercritical fluid containing a sample component is injected from the capillary as the sample solution,
the capillary includes a side surface and a tip surface perpendicular to the side surface,
the coating material covers a region including at least the tip surface of the capillary, and
the coating material remains on the region including at least the tip surface of the capillary during injection of the supercritical fluid containing the sample component
wherein the coating material covers only the tip surface of the capillary.

2. The ionizer according to claim 1, wherein the coating material is chromium nitride.

3. The ionizer according to claim 1, wherein the coating material is platinum.

4. The ionizer according to claim 1, wherein the coating material is titanium.

5. The ionizer according to claim 1, wherein the coating material is diamond-like carbon.

6. The ionizer according to claim 1, wherein the coating material is a fluororesin.

7. The ionizer according to claim 1, wherein the sample solution injected from the capillary is ionized by an electrospray method.

8. The ionizer according to claim 1, wherein the sample solution injected from the capillary is ionized by an atmospheric pressure chemical ionization method.

9. The ionizer according to claim 1, wherein the supercritical fluid injected from the capillary is carbon dioxide.

10. The ionizer according to claim 1, further comprising a main body part covering a part of an outer peripheral surface of the capillary.

11. The ionizer according to claim 10, wherein
one end portion of the capillary is connected to a mobile phase flow path for flowing a mobile phase, and
the other end portion of the capillary protrudes from the main body part into the ionization section.

12. The ionizer according to claim 11, wherein the other end portion of the capillary is coated with a coating material.

13. A mass spectrometer system comprising the ionizer according to claim 1.

14. The ionizer according to claim 1, wherein the coating material is a metal.

15. The ionizer according to claim 1, wherein the thickness of the coating material is about 10 μm.

* * * * *